Nov. 1, 1932.    P. Y. SMILEY    1,885,383
METHOD OF MAKING FOOTWEAR
Filed March 26, 1930
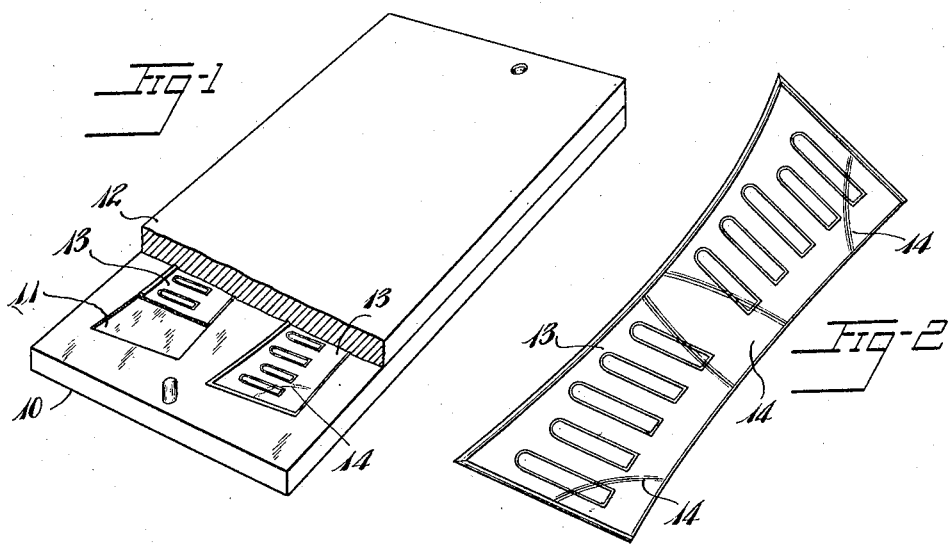
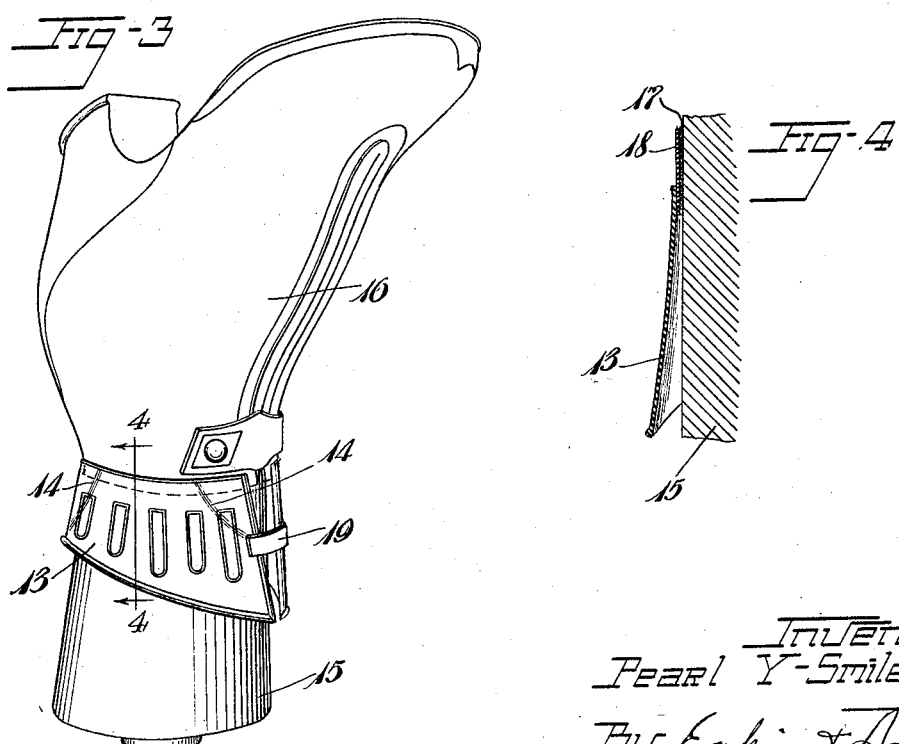
Inventor
Pearl Y. Smiley
By Eakin & Avery
Attys.

Patented Nov. 1, 1932

1,885,383

UNITED STATES PATENT OFFICE

PEARL Y. SMILEY, OF AKRON, OHIO, ASSIGNOR TO THE B. F. GOODRICH COMPANY, OF NEW YORK, N. Y., A CORPORATION OF NEW YORK

METHOD OF MAKING FOOTWEAR

Application filed March 26, 1930. Serial No. 439,041.

This invention relates to methods of making footwear, and more especially it relates to procedure for making rubber and fabric overshoes of the galosh type which have a rubber cuff attached to the top thereof.

In the manufacture of overshoes of the character mentioned, it has been the practice heretofore to make the cuff from two sheets of rubber which have been suitably ornamented by calendering, to assemble said sheets in back-to-back relation, adhere the assembled structure to the upper margin of the overshoe, and then vulcanize the overshoe in the usual manner. The principal objections to this method are that the ornamental design on the cuff frequently was mutilated in the assembling of the plies thereof, air frequently was entrapped between the plies and formed a blister when the overshoe was vulcanized, difficulty was experienced in providing local reinforcement in the cuff, and the cuff frequently adhered to the last during vulcanization and was blemished.

The chief objects of this invention are to provide a rubber cuff for overshoes which will have clear and sharply defined surface ornamentation; to provide a rubber cuff for overshoes with local reinforcement in the regions subject to greatest strain; to obviate the entrapment of air in the cuffs of overshoes during the manufacture thereof; to obviate the adhesion of overshoe cuffs to the lasts during the vulcanization of the overshoes; and to provide an improved method of making footwear in which all the foregoing objects are attained.

Of the accompanying drawing:

Fig. 1 is a perspective view of a mold adapted for the practice of my invention, and the work therein, parts being broken away and in section.

Fig. 2 is a plan view of a rubber shoe-cuff before it is applied to an overshoe.

Fig. 3 is a perspective view of an overshoe last and an overshoe thereon as they appear during the vulcanizing step of my improved method.

Fig. 4 is a section on line 4—4 of Fig. 3.

Briefly stated, my invention comprises molding and partly vulcanizing a rubber cuff for overshoes, building the overshoe upon a last, adhering the molded cuff to the lasted overshoe, and then vulcanizing the overshoe, upon the last, by heat and pressure in the usual manner.

Referring to Fig. 1 of the drawing, 10 is a mold member formed with a plurality of molding cavities, such as the cavity 11 therein, and having the usual cover 12. The mold is adapted for the making of cuffs 13 of plastic material such as rubber, which cuffs may be ornamented on one or both sides, and which preferably are formed with local regions of increased thickness 14, 14 to reinforce the cuff at the points of greatest strain. The cuffs 13 are partly vulcanized in the mold, so that upon removal therefrom they are not tacky, and may be handled safely without distortion to the cuff or mutilation of the ornamental design thereon.

In Fig. 3 is shown a shoe last 15, and an overshoe 16 thereupon, the latter comprising a fabric lining 17 and a rubber outer layer or facing 18, (see Fig. 4). The cuff 13 is attached to the overshoe 16 by cementing a marginal portion of the cuff to the outer facing 18 of the overshoe at the top thereof.

The overshoe is vulcanized in open heat under pressure while still upon the last, the latter being supported in the inverted position shown in Fig. 3. The body of the shoe is thus compacted against the last but the cuff 13 depends from the shoe like a skirt and stands clear of the last during vulcanization, so that the pressure fluid, free to contact both faces of it, does not press it against the last. A piece of adhesive tape 19 may be attached to the respective front marginal portions of the cuff 13 to hold said marginal portions in proper relative positions during vulcanization.

The cuff, being partly vulcanized before being attached to the overshoe, does not adhere to the last if perchance it comes in contact therewith before or during vulcanization, with the result that the cuff of the finished overshoe is perfectly formed and without blemish.

My invention may be modified within the scope of the appended claims, as I do not limit the claims wholly to the exact procedure described.

I claim:

1. The method of making overshoes which comprises building an overshoe of fabric and unvulcanized rubber upon a last, molding a cuff therefore by simultaneous contact over its entire area, mounting the cuff upon the overshoe, and then vulcanizing the assembled structure in open heat upon the last without substantial pressure of the cuff against the last.

2. The method of making overshoes which comprises building an overshoe of fabric and unvulcanized rubber, partly vulcanizing a cuff therefor, adhering the cuff to the overshoe, and then vulcanizing the assembled structure in open heat upon a last without substantial pressure of the cuff against the last.

3. The method of making overshoes which comprises building an overshoe of fabric and unvulcanized rubber, molding a cuff by simultaneous contact over its entire area and partly vulcanizing it, adhering the cuff to the overshoe, and then vulcanizing the assembled structure.

In witness whereof I have hereunto set my hand this 22nd day of March, 1930.

PEARL Y. SMILEY.